April 30, 1946. R. J. TAYLOR 2,399,258
NOVEL FILAMENTOUS PRODUCT AND METHOD OF MAKING IT
Filed March 20, 1943 2 Sheets-Sheet 1

INVENTOR.
ROBERT J. TAYLOR
BY Carl A. Castellan
ATTORNEY.

April 30, 1946.  R. J. TAYLOR  2,399,258
NOVEL FILAMENTOUS PRODUCT AND METHOD OF MAKING IT
Filed March 20, 1943   2 Sheets-Sheet 2

INVENTOR.
ROBERT J. TAYLOR.
BY Carl A. Castellan
ATTORNEY.

Patented Apr. 30, 1946

2,399,258

UNITED STATES PATENT OFFICE 2,399,258

NOVEL FILAMENTOUS PRODUCT AND METHOD OF MAKING IT

Robert J. Taylor, Claymont, Del., assignor to American Viscose Corporation, Wilmington, Del., a corporation of Delaware Application March 20, 1943, Serial No. 479,889

32 Claims. (Cl. 28—1)

This invention relates to filamentous or fibrous mats of extremely low density suitable for use as a heat insulation material, a buoyant material, for aerosol filtration, cushioning material and the like, and to methods of producing them.

Generally, the simplest product of the invention is prepared by causing a bundle of continuous filaments to be fanned out under turbulent conditions into a filamentary sheet and to be wound in the form of a cylindrical band while the sheet as a whole is being waved or traversed either regularly or irregularly in a direction generally or axially of the winding. After collection, the wound band is cut transversely and is then stretched in a direction transverse of the band while maintaining it taut along its length. The length of the band is somewhat reduced in the process, but both the width and thickness are greatly increased to produce an exceptionally light-weight fibrous product. Variations in the general procedure just outlined may be executed to produce modifications.

The invention will be more particularly described hereinafter with reference to the drawings in which Figure 1 illustrates one arrangement by which the method of the invention may be performed, Figure 2 illustrates a modification of the arrangement of Figure 1, Figure 3 illustrates another modification, Figure 4 is a vertical cross-section of Figure 3, Figure 5 is an elevation of another modification, Figure 6 is a cross-sectional view taken on line VI—VI of Figure 5.

Figure 7 is a front view of the take-up device of Figure 5,

Figure 1:
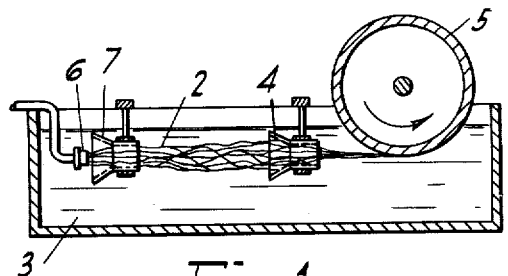
Figure 2:
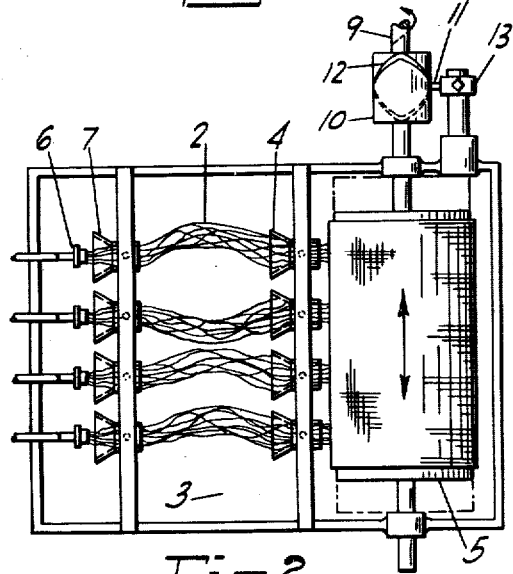

In Figure 1, a preferred arrangement for making the product as illustrated in which a bundle 2 comprising a large number of filaments are directly spun into a suitable coagulating bath 3 and are conducted directly to a take-up mechanism comprising the funnel guide 4 and the winding drum 5 which dips within the coagulating bath 3. Adjacent and in front of the spinneret 6, there may be placed another funnel guide 7 similar to the guide 4 associated with the drum 5. The guide 7 in front of the spinneret 6 is preferably arranged so that it cannot entirely prevent waving of the filamentary bundle as it proceeds from the spinneret through the coagulating medium. This waving motion of the bundle as it proceeds from the spinneret to the winding drum is caused primarily by the turbulence within the coagulating medium which is set up by the streaming of the filaments at a fairly rapid rate through the coagulating medium. By virtue of the waving action which varies constantly, it will be found that the filaments lying in one level of the filament bundle are disposed at an angle to the filaments in any other level of the bundle when viewed from above. This disposition constantly varies from the spinneret face to the point of collection. Because of the large diameter channel through the guide 4, there is effected no condensation of the filament bundle to a yarn-like strand at the point of winding but merely into a flat sheet and it will be seen that this constantly varying disposition of the filaments in the various levels of the filament bundle produce a winding which is composed of a plurality of layers or convolutions of unitary filament sheets in each of which layers the filaments inter-cross at various angles at successive points therealong. The take-up guide may take various forms besides the funnel shape shown. It may comprise merely two upright plates spaced apart any desired distance to provide for free passage of the filament bundle to the take-up drum as a sheet.

Where no traversing of the take-up guide 4 with respect to the drum 5 is employed, the actual waving motion of the filamentary bundle within the coagulating bath effects a certain amount of traverse of the sheet as it is laid upon the drum. The extent of this traverse is controlled by the disposition of the take-up guide 4 with respect to the drum 5. For example, where the distance A of Figure 1 between the open end of the guide 4 and the vertical tangent to the nearest side of the drum is 3 inches and guide 4 has a tubular channel having an inside diameter of 2 inches and a bundle of 3000 filaments having a diameter on the order of ½ to 10 microns is obtained from a spinneret having a diameter of about 1¼ inches, the natural traversing action caused by the waving will produce a wound band about two inches wide upon the drum. By reducing the distance A, a narrower band will be obtained for a given diameter of the tubular portion of the guide. Conversely, increasing the distance A produces a wider band for a given diameter of tubular guide. Alternatively the width of the band may be varied by increasing or decreasing the inside diameter of the tubular portion of the take-up guide, the width of the band being proportional to the diameter of the take-up guide. If desired, an increased width of band may be obtained by traversing either the guide 4 with respect to the drum 5 or the drum 5 with respect to the guide 4. If desired, the sheets of filaments from a plurality of adjacent spinnerets may be wound upon a single drum to produce a unitary winding of considerably greater width than can be obtained from the filaments produced from a single spinneret. For example, as shown in Figure 2, the filaments proceeding from a plurality of the spinnerets 6 in succession through the guides 7 and 4 are collected as a wide band upon the drum 8 mounted on shaft 9 which is reciprocated by the action of a rotating helical cam 10 upon the follower 11 which rides in the groove 12 of the cam and is secured to the shaft 9 by the fixed collar 13. The traverse is of sufficient magnitude to cause intermingling of the adjacent filamentary sheets by overlapping at the ends of the traverse strokes. The discharge cross-section of guides 4 of Figure 2 may have a circular, oval or narrow rectangular shape—in any case, a plurality of flat web-like sheets are formed and collected on the take-up drum.

In all the methods of collection in accordance with this invention, the important characteristics are: first, that the filaments in the various levels of a multiple-filament bundle are caused to become disposed at various angles with respect to each other so that they form a criss-crossed network, and second, that the multiple-filament bundle is wound in the form of a thin filamentary sheet instead of in the form of a yarn-like bundle, which sheet may be more or less traversed during winding.

Figure 3:
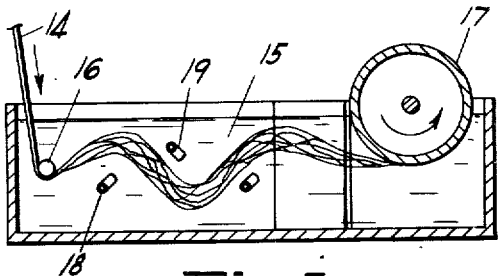
Figure 4:
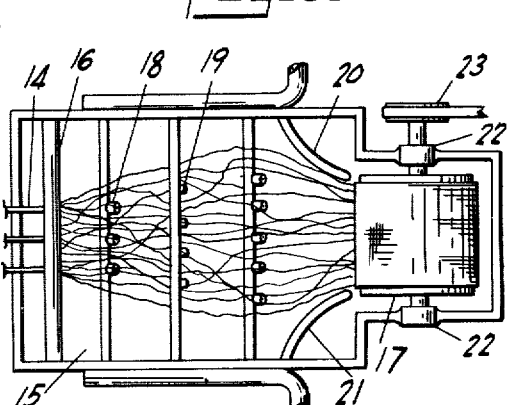

Figures 3 and 4 illustrate another modification of the invention. In this embodiment, a number of untwisted filamentary ropes or strands 14 are conducted down into the bath 15 under a horizontal rod 16 having a smooth surface and adapted to be rotated by the filaments. This rotatable rod 16 tends to fan out the filaments and as they proceed from the rod to the collecting drum 17 which is immersed in the liquid medium in a manner similar to that of Figures 1 and 2, the more or less sheet-like band of filaments passes beneath a series of nozzles 18 to produce jets of a fluid, such as of air or water, disposed at various points across the width and along the direction of travel of the filamentary sheet within the liquid medium. Similar nozzles 18 may be disposed beneath the path of travel of the filamentous sheet through the liquid medium. The nozzles in the upper tier are directed downwardly to cause turbulence and fanning out of the filaments in the upper surface of the sheet while the nozzles forming the jets in the lower tier are directed upwardly to disturb and fan out the filaments in the lower levels of the sheet. After being subjected to the combined action of the jets from above and below the traveling sheet, it passes between lateral limiting guides 20 and 21 to the take-up drum 17 which may be mounted on suitable bearings 22 and driven by a pulley 23 as shown. In this embodiment, the rod 16 may be replaced with a stationary pipe with numerous perforations underneath. Water may be introduced into the pipe and its spraying through the perforations assists the fanning out of the filaments.

Figure 6:
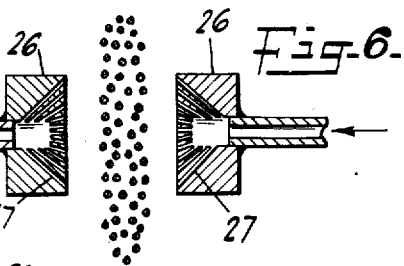
Figures 5, 8:
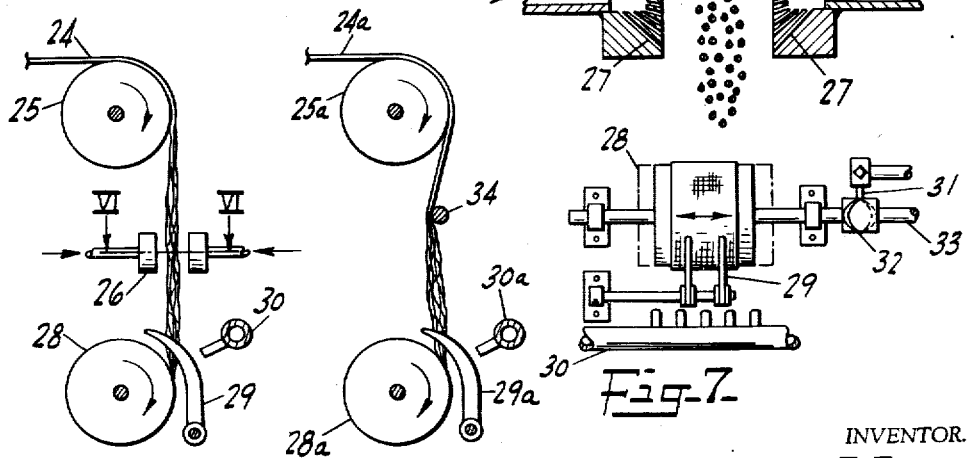
Figure 8 is an elevational view of another modification.

In Figures 5 to 7, an untwisted filamentary tow or rope 24 is delivered by a roll 25 from a suitable source of supply to form a descending filamentary bundle. Upon each side of the descending bundle, there is disposed a nozzle 26 for directing a plurality of jets of a fluid, such as of air or water, against the bundle. The orifices 27 of the nozzle 26 are disposed to direct their jets at a gradually increasing angle with respect to a vertical plane through the centers of the two nozzles as the distance of each orifice from that plane increases. In this manner, the jets tend to fan out the rope. If desired, a pair of such oppositely disposed nozzles may be arranged to play upon the descending bundle at each of a plurality of points therealong. The fanned out sheet of filaments is then collected upon a collecting drum 28 rotated at a suitable speed, a pair of laterally limiting guides 29 being disposed with respect to the drum 28 to prevent the filamentary sheet from overlapping the edges thereof. These guides may be separated by a distance greater than the width of the fanned out band of filaments descending thereto so that a certain amount of traverse is permitted, such traverse being effected by the natural period of waving of the filamentary sheet caused by the unstable character of action of the jets thereupon. Alternatively, the filamentary sheet may be collected upon a drum having considerably larger axial length than the width of sheet produced by the fanning out jets and, in this case, the drum 28 may be traversed as shown in Figure 7 by the action of the stationary follower 31 in the helical cam 32 which is secured on shaft 33 for rotation therewith.

The fanning out accomplished by the arrangement of Figures 5 to 7 is enhanced markedly when the filaments operated upon are of hydrophobic character since the rubbing of such filaments against each other tends to develop a strong electrostatic charge which causes the filaments to repel each other. When the charge thus developed tends to interfere with the winding on the drum, a pipe 30 with spray nozzles may be provided so that the filaments may be sprayed with water or aqueous solutions to effect a rapid discharge at the point of their take-up.

In Figure 8 a delivery roll 25a feeds a descending filamentary bundle 24a which proceeds through an electrically charged comb 34. The repellence of the similarly charged filaments as they leave the comb causes their fluffing out to fill a much larger volume. The fluffed out bundle is then collected upon the winding drum 28a which is controlled by the lateral guides 29a. To facilitate the discharge of the electric charges upon the filaments, they may be sprayed by spray pipe 30a with water or other conducting liquid as they make contact with the preceding windings on the drum. To accomplish this result in an alternative manner the drum may operate partially immersed within such a liquid. Similarly, the drum may be grounded or charged oppositely to the charge on the filaments. If desired, the filaments fluffed out by the comb may be passed through a second comb to increase the fluffing action, especially where large bundles of filaments are involved. Where hydrophobic filaments are used, the comb may be replaced by a guide or ring of glass or other material tending to take on an opposite electric charge with respect to the filaments upon rubbing therewith.

After collection by any of the arrangements described, the wound band of filamentary material is slit in the direction of its width and, if collected while wet, it is permitted to dry. Where winding is effected while the filaments are in a dry condition, it may be desirable to soak the wound mass to compact it. Soaking should be done in a liquid having no swelling effect on the filaments and should be followed by drying. Drying may be performed in any manner. When time permits, the winding may merely be exposed to ordinary atmospheric conditions for 24 to 48 hours depending upon the filament diameters, the finer the filament, the longer the drying period allowed. Before drying, the cut band may be flattened so that it lies in a substantial plane. The product after drying then has the appearance shown in Figure 9 when looking at its largest area which may be termed its face.

Figure 9:
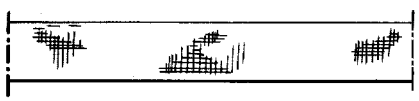
Figure 9 is a face view of the wound filamentary band after cutting.
Figure 10:
Figure 10 is a cross-sectional view of the band of Figure 9.
Figure 11:
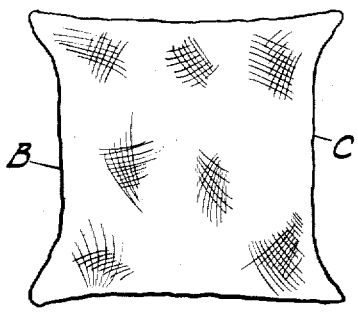
Figure 11 is a face view of an expanded product.
Figure 12:
Figure 12 is an edge view of the expanded product of Figure 10.
Figure 13:
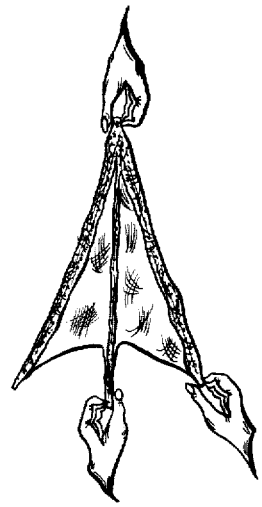
Figure 13 illustrates the cleavage of the product of Figure 10.
Figure 14:
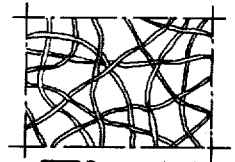
Figure 14 is a greatly enlarged face view of a portion of the product of Figure 11 roughly illustrating the network.

The compact dried band of filamentous material having the appearance of Figure 9 is then seized at its four corners (or at numerous spaced points along each of the two sides which extend in the same general direction as the length of the filaments) and while maintaining it under tension along its length between the points of seizure, it is stretched out in the direction of its width as a result of which it assumes the shape of Figure 11 as its face view. This stretching along the width is accompanied by a surprising expansion in the thickness of the material. A rough idea of the change in thickness may be illustrated by the comparison between Figure 10 and Figure 12, the former showing the cross-section before stretching and the latter the thickness along one edge after expansion. The exact extent of expansion in thickness depends upon the extent of stretching along the width and upon the fineness of filament diameters making up the material. In a typical case, a band comprising filaments having an average diameter of 3 microns and having the dimensions of 36" x 2" x 0.045" and having a bulk specific gravity of 0.70 was stretched so that its two-inch width became 28 inches. The length of 36 inches decreased to 20 inches and the thickness increased from 0.045 inch to 3 inches. The resulting batt had a bulk specific gravity of 0.0013. The expansion illustrated is far from the maximum obtainable so that batts of still lower apparent specific gravity may be obtained by increased stretching.

The expanded product obtained in this manner is composed of a number of separable strata or layers, each of which is composed of an intricate network of the filaments. By separating the strata of a mat having a given specific gravity and then recombining them merely by laying the strata on top of one another a mat of lower bulk specific gravity is obtained. The network of an individual strata is of three-dimensional rather than two-dimensional character as a result of the fact that the filaments constituting it are disposed in a generally wavy configuration and because of the fact that the plane of this waviness may be inclined at different angles along the length of each filament. The term "stratum" as used herein refers to a filamentous layer bounded by any two adjacent internal surfaces along which cleavage takes place with comparative ease. It ordinarily comprises a plurality of convolutions or sheets of the original winding as most of them tend to cohere to their neighbors. This tendency to cohere may be attributed partly to the fact that in winding the irregularly arranged sheet of filaments, grooves of various depths and lengths may occur between the outermost filaments of the winding at any time during its formation. These grooves follow an irregular path about the periphery of the winding and do not necessarily continue completely therearound. Their presence permits some of the filaments of one or more succeeding convolutions to enter them. This causes an intermingling of irregular character between the filaments of a plurality of successive convolutions. When the wound band is subsequently stretched, the expansion in thickness is apparently caused by this intermingling. The motion of the intercrossed and intermingled filaments during expansion may be likened to a certain extent to the action of the mechanical device referred to as lazytongs. However, the filaments apparently acquire a wavy configuration because of their tendency to cohere at numerous points of tangency, though considerable slipping must also occur at many of these points. The fact that occasionally during the winding the occurrence of relatively shallow grooves may offer but little opportunity for intermingling gives rise to the surfaces of ready cleavage. The strata thus defined can frequently be subdivided with the exercise of special care into the thinner laminations comprising a smaller number of individual convolutions of the original winding. With considerable difficulty and the exercise of extreme care laminations consisting of a single convolution can sometimes be obtained and such may be designated as a web. This web may have an overall area as large as that of the strata, but ordinarily, it is smaller in area, especially when the winding is produced under conditions permitting a certain amount of traverse. This web is usually not flat but generally is an irregularly undulated plane. The filaments within the individual strata form an intricate network as a result either of their intercrossing or of the tendency of the tangent waves of adjacent filaments to cohere. The interstitial character of the network may in numerous places depend on both of these factors. Each filament in the product usually lies within a definite stratum and usually extends substantially the entire distance from one side to the opposite side of the product. Referring to Figure 11, the filaments would extend from side B to side C. The definite cleavage surfaces extend in directions generally parallel to the face as viewed in Figure 11.

The characteristics of the product may be varied considerably merely by variation in the size of filaments from which it is made. By starting from extremely fine filaments having diameters within the range of ½ micron to 10 microns, an extremely fluffy and downy product having low air-permeability is obtained in which the filaments exhibit a pronounced coherence, possibly the result of the large surfaces they possess. This fluffy character appears to be exceptionally pronounced when the product is made from hydrophobic filaments probably as a result of the pronounced development of electro-static charges because of the rubbing of the filaments against each other during expansion. The individual filaments within the product are extremely flexible and lack resilience. However, the product as an entity exhibits sufficient structural stability to be self-supporting and it shows a reasonable recovery from compression. It may be enveloped within a suitable fabric cover to produce a heat insulating material either for use as a comforter or in clothing, or for disposal within walls, ceilings, or floors of "cold storage rooms," refrigerators, houses, ships or other building structures. When serving as a heat insulation material, the low gas and air permeability is an outstanding advantageous characteristic of these products. This extremely fine filament product is useful as a filter for fine smokes or vapor suspensions in gases.

Between the extremely fine filaments having from ½ to 10 microns diameter and larger diameter filaments of 5 or more deniers, filaments of intermediate diameter may be used to make products which combine the characteristics of those made from extremely fine filaments (though shaded off to a degree) with a certain degree of the properties that are obtainable with the larger filaments. Where filaments of a large diameter are employed, the product obtained exhibits a high degree of resilience and are particularly suitable for use as cushions, buoyant material and to a lesser extent for heat insulation.

The products of this invention may be produced from any artificial continuous filaments, such as those of regenerated cellulose from viscose or cuprammonium cellulose, or cellulose organic derivatives such as cellulose ethers and esters and particularly cellulose acetate or vinyl resins such as polyvinyl chloride, copolymers of vinyl chloride and vinyl acetate, after-chlorinated polyvinyl chloride or after-chlorinated copolymers of vinyl chloride and vinyl acetate and copolymers of vinyl chloride and acrylonitrile, or from filaments of any other plastic material whether organic or inorganic, such as glass or mineral wool filaments. Natural continuous filaments, such as silk may also be used.

A modified product may be obtained by subjecting the dry band to an agent for shrinking the filaments therein. For example, in the case of a vinyl resin, such as a copolymer of vinyl chloride and vinyl acetate, this may be accomplished by heating the product to a temperature above the minimum shrinkage temperature but below the softening point of the resin. For other types of filaments, such as of cellulose acetate, regenerated cellulose, and so on, the conventional shrinking agents may be used. The products obtained by preliminarily treating the bands with shrinking agents are generally similar to those obtained without such treatment. However, the filaments in the product made with shrinking exhibit greater and more permanent crimpiness and the product as a whole is somewhat more bulky or lofty. The effect exerted by the shrinkage depends to a large extent upon its effect upon the individual filaments which in turn depends largely upon the material of which the filaments are made. For example, an expanded product made of vinyl resin filaments by a process including the shrinking steps exhibits not only considerably more crimp in the individual filaments and an improved resilience in the product as compared with one made from the same filaments by a process omitting the shrinkage treatment, but the expanded product exhibits considerable elasticity and greater coherence between the filaments throughout the mass. In addition, this specific product exhibits somewhat greater air-permeability.

Bands may be produced from a mixture of shrinkable filaments with non-shrinkable filaments or with a mixture of two or more types of filaments having different shrinkage characteristics. The mixture may comprise filaments of different materials entirely, one of which is shrinkable under conditions which will not affect the other. Alternatively, filaments made of the same material but under different conditions, such as with a different percentage of stretch, may be mixed and subjected to an agent to differentially shrink the constituents therein. In this manner, a wide range of products may be obtained with various properties.

Similarly, the products may be produced from a mixture in any desired proportions of continuous filaments of two or more different materials. Depending upon the precise materials from which the filaments of the product are made up and upon the proportions of the constituents in any mixture of filaments in the product, the properties of the final product may be controlled within a wide range and preselected to meet any desired standards. A particularly advantageous combination is obtained by mixing filaments of rubbery elasticity, such as of rubber itself or of elasticized vinyl resins (for example, the elastic filaments produced from a mixture of a vinyl acetate-chloride copolymer with about 30% of dibutylsebacate or similar elastifying plasticizer) with filaments lacking that characteristic. After expansion by the methods described above, products of light weight and resiliency are obtained which are outstandingly suitable as filling material for cushions or for padding in clothing and bedding. Another advantageous combination is obtained by mixing a minor proportion of potentially adhesive filaments with a relatively large proportion of filaments of non-adhesive material which, after collection upon the winding drum, may be subjected to an activating agent for the potentially adhesive filaments, such as heat, a solvent or a swelling agent to render the potentially adhesive fibers tacky and to cause them to adhere to the non-adhesive filaments. After deactivation, such as by cooling or by evaporation of the solvent or swelling agent, the band may be stretched as suggested hereinabove. The product obtained in this fashion may comprise a skeleton network composed of the adhesively secured filaments capable of preventing the ready separation into strata along the cleavage surfaces in the surrounding mass of filamentous material through which it is intimately intermeshed. When it is desired to have the bulk of the material formed of fine diameter filaments, it is preferable to mix a major quantity of non-adhesive filaments of the fine diameter with a minor proportion of potentially adhesive fibers of larger diameter, activate, deactivate, and expand.

Figure 15:
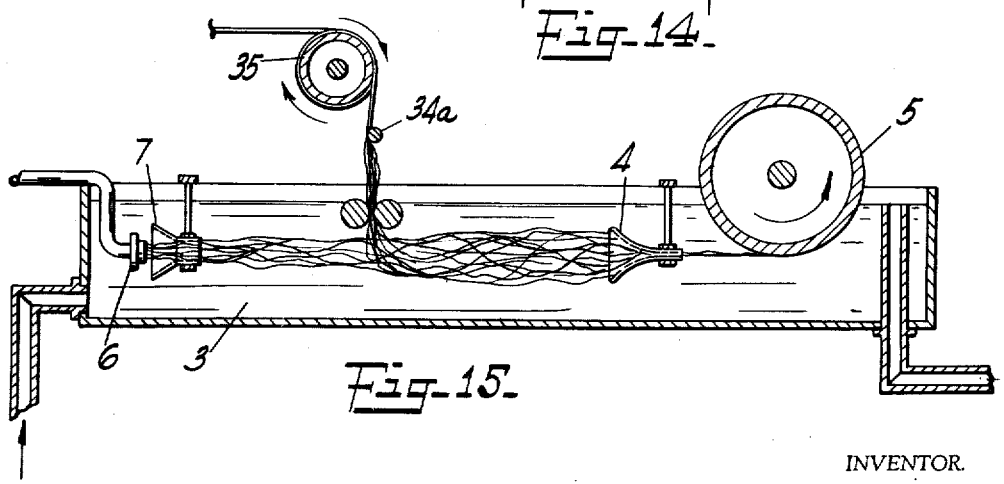
Figure 15 illustrates one arrangement for mixing different types of filaments.

Figure 15 illustrates one way of mixing filaments of two different materials. Filaments made of one material may be extruded by the spinneret 6 and after passing through the guide 7 are joined by filaments of another material which is delivered by the feed roll 35 and passes through an electrically charged guide 34a just before it falls into the coagulating bath 3. The two types of filaments are intercrossed and are condensed only to a thin sheet as they are wound upon the drum 5. The proportions of the two types of filaments may be varied widely. By varying the proportions of potentially adhesive filaments in the mass, the internal skeleton may be made more or less extensive and the cleavage surfaces will be bridged by adherence of the filaments at more or less numerous points therein. If desired, the activating agent may be applied only to selected portions of the compact band. In this way, a greater control can be exercised over its effect. For example, the agent may be restricted to narrow parallel lines transverse of the band or to follow a screen pattern composed of two intersecting sets of parallel lines.

Another way of combining different materials is to superimpose wound bands of filaments collected in the novel manner described above upon alternate layers of carded batts of about the same area made of filaments of a different material. The wound bands should be placed with their filaments extending in the same general direction, but the carded batts may be disposed with their fibers lying in the same direction as, or transverse to, the filaments of the wound bands. The edges may then be compressed and, if one of the materials is potentially adhesive, the filaments may be rendered adhesive at the edges to cause them to become adhered at numerous points of mutual contact without causing a complete coalescence or welding around the edges of the laminated matt. Thereafter, the product may be expanded by stretching it transverse of the length of the filaments in the bands formed by winding. Alternatively compression, with or without fiber and filament adhesion, may be applied to the entire area, or to any selected portions of regular or irregular pattern of the laminated mat before expansion.

The character of the cut made in severing the dried band may be varied to obtain special effects in the products when they are made from fine diameter filaments. The use of a razor or similar tool which involves substantially no mashing or crushing during cutting leaves an edge of the product substantially as thick as the main body and in which the ends of the filaments are distinct and separate. Where a scissors or any type of shear is used which involves mashing of the filaments during cutting, the edges have the appearance of a seam, as though they were stitched together. The product in the latter case takes on the shape of a pillow.

Novel and useful effects may be obtained when the products comprise a major proportion of filaments of a potentially adhesive material, such as cellulose acetate, vinyl resins, and the like by simultaneously applying an activating agent and pressure at preselected areas of the blanket. For example, a quilted effect may be produced by applying the agent with pressure along a predetermined lined pattern, such as by an embossing roll, either before or after enveloping the blanket or mat with a covering fabric.

While the product may be made from individual filaments by any desired diameter, the most desirable products for many purposes are obtained from filaments of extremely fine diameter, such as those having a diameter of one or two denier or less. Filaments having extremely fine diameters between ½ to 10 microns are of particular interest when converted into filamentous products in accordance with the present invention. By suitable selection of filament size, with or without adjustment or pre-selection of other factors, such as extent of expansion, shrinkage or coalescence, products having characteristics such as specific gravity, air permeability, compressibility, resilience, heat transfer resistance, falling within a wide range may be obtained.

By using winding drums of larger or smaller diameters; by permitting more or less traverse in winding the filamentary sheet thereon; and collecting bands of greater or less thickness, final expanded products having any desired dimensions may be produced. There is no difficulty whatsoever in producing blankets or mats as large or larger than, 12 feet by 12 feet and as thick as 15 inches or more by the procedures herein outlined.

The uses of the products include: filler material for clothing, cushions, comforts; heat insulation for building structures, such as for refrigerators, cold storage rooms, or houses; buoyant material in the place of such filaments and fibers as kapok; and filtration material for aerosols or fine smokes.

EXAMPLE 1

A spinning solution of acetone of 5% by weight of a copolymer (having a softening point to 65 to 70° C.) of vinyl acetate and vinyl chloride in which there was 90% by weight of vinyl chloride was stirred, deaerated and heated to 50° C. While maintaining the spinning solution at this temperature, it was spun into water maintained at 45° to 48° in which the acetone was kept below 4% at the rate of 30 cc. per minute through a 1¼ inch diameter spinneret having 3000 orifices of 1½ mil each and the filaments thus spun were collected upon a 12-inch diameter winding drum which was immersed 2 inches below the surface of the bath during rotation. The immersion travel of the filaments from the spinneret face to the point of winding upon the drum was about 36 inches and the filaments passed from the spinneret to the winding drum through a pair of funnel guides, the tubular portion of which had a diameter of two inches. The dimension A of Figure 1 was 3 inches and the winding speed was 67 meters per minute. The filaments thus produced varied from 2.5 to 3.8 microns and had an average of 3.2 microns in diameter. The band was cut from the winding drum after the desired thickness was obtained and the flattened band was allowed to dry in the air for 48 hours. The dried band having the dimensions of 36 inches by 2 inches by 0.045 inch and weighing 37 grams (having an apparent density of 0.70) was stretched until its original 2-inch width reached the dimension of 28 inches. The 36-inch length decreased to 20 inches and the thickness increased to 3 inches. The resulting batt or blanket had an apparent specific gravity of 0.0013. This batt retained its dimensions indefinitely under its own weight when laid flat upon a table. It may be provided with a rigid covering and serve for the uses mentioned above, such as heat insulation. The batt may be compressed somewhat and then covered to obtain a buoyant material. Such material is highly water-impervious even when subjected to moderate pressures such as would be encountered in submersion to depths common to life-preserving equipment. It may be used as a filling material for walls, ceilings and floors of building structures which it is desired to thermally insulate. Alternatively, it may be compressed somewhat and placed between two layers of gauze or other fabric in which form it may be used as a filler for clothing, comforts, cushions, and so forth. Other materials, filamentous or otherwise, which are susceptible to moisture may be enclosed in batts of various thicknesses of this water-impervious material and the resulting products may be used for heat insulation, buoyant material, cushions, comforts, clothing.

EXAMPLE 2

A band of material collected as described in Example 1 may be subjected to shrinking by treatment in a heated fluid, such as air or water, at 80° C. As one example of this procedure, a band treated in water was shrunk by 30% of its length. After drying, the ribbon was stretched, considerably more force being needed for this purpose than for the unshrunk material. After stretching, the material exhibits a certain amount of elasticity in that it recovers a portion of its dimension in the direction of stretching. In addition, the filaments within the product exhibit considerably more crimpiness.

Table I gives a comparison of a blanket obtained from a copolymer of vinyl chloride and vinyl acetate in accordance with the present invention without shrinkage or coalescence and a kapok blanket such as is used in a high altitude suit for aviators. Table II compares the buoyancy of kapok with a blanket of Vinyon similar to that referred to in Table I.

*Table I*

| Material | Average filament diameter microns | Filler weight in mat, oz./yd.² | Air permeability ft.³/min./ft.² | Compressional resilience,¹ percent | Percent compression between 0.01 and 0.1, lb./in.² |
|---|---|---|---|---|---|
| Vinyon | 5.0 | 3.6 | 28 | 60 | 41 |
| Kapok (grained) | 25.0 | 5.6 | 46.7 | 42 | 42 |

¹ Compressional resilience was determined by the method given in the National Bureau of Standards Research Paper RP 561, "The Compressometer, an Instrument for Evaluating the Thickness, Compressibility and Compressional Resilience of Textiles and Filamentary Material," by H. F. Schiefer.

*Table II*

| Material | Vinyon | Kapok (grained) |
|---|---|---|
| Weight of material grams | 1.9 | 12.4 |
| Weight of coarse cotton gauze cover do | 1.2 | 2.0 |
| Filament diameter microns | 5.5 | 25.0 |
| Buoyancy ¹ { 1 min. immersion | 28.5 | 34.2 |
| 24 hr. immersion | 27.1 | 27.6 |
| 144 hr. immersion | 26.2 | 19.5 |

¹ Buoyancy is weight supported in water weight of material.

As compared to the Vinyon product having the characteristics of the above two tables the product obtained by subjecting it to the shrinkage treatment mentioned hereinabove has increased bulk, air permeability, compressibility, and decreased compressional resilience. The loss in compressional resilience however, is well justified by the increase in bulk when the material is to be used as a filler for clothing. However, the shrinkage treatment might not be desirable for producing material to be used for certain types of thermal insulation.

The vinyl resin mats compare favorably with that of kapok for use as a buoyant material as is apparent from Table II. For this purpose, they have the advantage over kapok in that the filaments do not absorb water but rather repel it so that the air entrapped within the mat structure is not readily displaced by water. Hence, the mat is capable of maintaining its low density for a longer period of time than kapok when in contact with water.

For the purpose of heat insulation material, vinyl resin mats produced in accordance with this invention are outstanding. In the first place, the vinyl resins themselves have a comparatively low thermal conductivity. The mats may be made of extremely low densities from 0.7 to less than 0.001 gram per cubic centimeter. The mats made in accordance with this invention are characterized by permanent and substantially uniform density. In addition, the mats comprise criss-cross filaments lying substantially in generally parallel planes so that the mat is substantially laminar in character. By disposing the laminations substantially perpendicular to the direction of heat flow, it will be seen that there is no path provided by the mat for a direct heat conduction along solid filaments from the hot surface to the cold surface. The laminar character of the product assures that the travel of heat by conduction will be forced to take the longest possible route between the opposite faces of the mat. Mats of vinyl resins in particular exhibit moisture retentions of less than 0.05% at 58% relative humidity and 75° F., are highly resistant to attack by alkalies and mineral acids of all strengths, oils, fats, waxes, alcohols, etc. and are non-inflammable.

The filamentous masses of the present invention are characterized by a high resistance to transfer of heat by conduction as well as by convection, especially in the direction of their thickness. This is attributable to the extreme subdivision of the space occupied by the mats by the criss-cross filaments extending in undulated planes substantially at right angles to the thickness of the mats and to the fact that the lattice work formed by the filaments in one web is out of alignment with that in adjacent webs lying generally parallel thereto. The extreme intricacy of the network is particularly noticeable when a large number of filaments of extremely fine diameter are converted into the product. In such an event, each web appears to consist essentially of the 3000 filaments intimately and intricately criss-crossed upon one another with, of course, considerable undulation and deviation from a flat plane. The superimposition of web on web of such irregularly arranged inter-crossing filaments with the additional waviness in the individual filaments produces a filamentous mass having an intricate network disposed across the path of travel in the direction of the thickness of the mat. All filaments in one web, lamination or strata do not contact all filaments in the next adjacent at the points where they appear to cross as a result of the distortion caused by the stretching. The result is a special network of filaments, none of which presents a solid path of conduction from one face to the other of the mat and across which the transfer of heat by conduction must take numerous lengthy deviations along the filaments lying at angles approaching a right angle to the path of heat transfer.

While preferred embodiments of the invention have been disclosed, it is to be understood that changes and variations may be made without departing from the spirit and scope of the invention as defined by the appended claims.

What I claim is:

1. The method of collecting continuous filaments comprising the steps of passing a multiple-filament bundle through a liquid under turbulent conditions to expand the bundle and winding the bundle while still expanded so that it is collected in the form of a sheet of a width comparatively large with respect to its thickness while still submerged in the liquid.

2. In a method of making a light-weight filamentous product, the steps of passing a multiple-filament bundle through a fluid medium under turbulent conditions, condensing the bundle into a sheet of a width comparatively large with respect to its thickness, collecting the sheet in the form of a multiple-layered winding, severing the winding along its width and stretching it out while in substantially dry condition in the direction of its width while permitting it to expand in thickness.

3. In a method of making a light-weight filamentous product, the steps of passing a multiple-filament bundle through a fluid medium under turbulent conditions, condensing the bundle into a sheet of a width comparatively large with respect to its thickness, collecting the sheet in the form of a multiple-layered winding, severing the winding along its width, drying it in the form of a flat band, and stretching the dried band out in a direction generally transverse to the lay of the filaments therein to produce a filamentous mass of greater volume and thickness.

4. In a method of making a light-weight filamentous product, the steps of delivering a multiple-filament bundle from a source of supply, fanning out the bundle as it is delivered to form a thin sheet in which the filaments intercross in haphazard fashion, collecting the sheet in the form of a multiple-layered winding, severing the winding along its width, drying it in the form of a flat band and stretching the dried band out in a direction generally transverse to the lay of the filaments therein to produce a filamentous mass of greater volume and thickness.

5. In a method of making a light-weight filamentous product, the steps of passing a multiple-filament bundle through a liquid under turbulent conditions and winding the filaments in the form of a sheet of width comparatively large with respect to its thickness, severing the winding along its width, drying the winding in the form of a flat band, and stretching the dried band in a direction generally transverse to the lay of the filaments therein to product a filamentous mass of greater volume and thickness.

6. In a method of making a light-weight filamentous product, the steps of passing a multiple-filament bundle comprising filaments of a diameter between ½ to 10 microns through a liquid under turbulent conditions and winding the filaments in the form of a sheet of width comparatively large with respect to its thickness, severing the winding along its width, drying the winding in the form of a flat band, and stretching the dried band in a direction generally transverse to the lay of the filaments therein to produce a filamentous mass of greater volume and thickness.

7. In a method of producing a light-weight filamentous product, the steps of passing a multiple-filament bundle comprising filaments of a synthetic linear polymer through a liquid under turbulent conditions, winding the filaments in the form of a sheet of width comparatively large with respect to its thickness, severing the winding along its width, drying it in the form of a flat band, and stretching the dried band out in a direction generally transverse to the lay of the filaments therein to produce a filamentous mass of greater volume and thickness.

8. In a method of making a light-weight filamentous product, the steps of passing a multiple-filament bundle comprising filaments of a copolymer of vinyl chloride and vinyl acetate through a liquid under turbulent conditions, winding the filaments in the form of a sheet of a width comparatively large compared to its thickness, severing the winding along its width, drying it in the form of a flat band, and stretching the dried band out in a direction generally transverse to the lay of the filaments therein to produce a filamentous mass of greater volume and thickness.

9. In a method of making a light-weight filamentous product, the steps of passing a multiple-filament bundle comprising filaments of a thermoplastic vinyl resin through a liquid under turbulent conditions, winding the filaments in the form of a sheet of width comparatively large with respect to its thickness, severing the winding along its width, drying it in the form of a flat band, subjecting the dried band to a temperature above the shrinkage temperature but below the temperature at which the vinyl resin filaments become tacky, cooling the thus shrunk band and stretching it out in a direction generally transverse to the lay of the filaments therein to produce a filamentous mass of greater volume and thickness.

10. In a method of making a light-weight filamentous product, the steps of passing a multiple-filament bundle comprising non-adhesive filaments and potentially adhesive filaments through a liquid under turbulent conditions, winding the filaments in the form of a sheet of width comparatively large with respect to its thickness, severing the winding along its width, drying it in the form of a flat band, subjecting the dried band to an agent for activating the potentially adhesive filaments to cause them to become tacky and to adhere to each other and to the other filaments at their points of contact, deactivating the filaments thus rendered adhesive, and stretching the dried band out in a direction generally transverse to the lay of the filaments therein to produce a filamentous mass of greater volume and thickness.

11. In a method of making a light-weight filamentous product, the steps of passing a multiple-filament bundle comprising non-adhesive filaments and potentially adhesive filaments of a thermoplastic vinyl resin through a liquid under turbulent conditions, winding the filaments in the form of a sheet of width comparatively large with respect to its thickness, severing the winding along its width, drying it in the form of a flat band, subjecting the dried band to an agent for activating the potentially adhesive filaments to cause them to become tacky and to adhere to each other and to the other filaments at their points of contact, deactivating the potentially adhesive filaments and stretching the dried band out in a direction generally transverse to the lay of the filaments therein to produce a filamentous mass of greater volume and thickness.

12. In apparatus for collecting continuous filamentary material, means for distributing continuous filaments in the form of a continuously traveling expanded bundle, a winding drum, and a guide arranged between the distributing means and the drum and in proximity to the drum for leading the expanded bundle without substantially condensing it onto the drum.

13. A method of making a light-weight filamentous product comprising the steps of passing a multiple-filament bundle through a fluid medium under turbulent conditions, condensing the bundle into a sheet of a width comparatively large with respect to its thickness, collecting the sheet in the form of a multiple-layered winding and expanding the winding substantially as a unit by pulling two of its opposite edges apart in a direction generally transverse of the lay of the filaments therein to produce a filamentous mass of greater volume and thickness.

14. A method of making a light-weight filamentous product comprising the steps of delivering a multiple-filament bundle from a source of supply, fanning out the bundle as it is delivered in the form of thin sheet in which the filaments intercross in haphazard fashion, collecting the sheet in the form of a multiple-layered winding and expanding the winding substantially as a unit by pulling two of its opposite edges apart in a direction generally transverse of the lay of the filaments therein to produce a filamentous mass of greater volume and thickness.

15. In a method of making a light-weight filamentous product, the steps of passing a multiple-filament bundle through a liquid medium under turbulent conditions, condensing the bundle into a sheet of a width comparatively large with respect to its thickness, collecting the sheet in the form of a multiple-layered winding, severing the winding along its width and subsequently stretching it out while in substantially dry condition in a direction generally transverse to the lay of the filaments therein to produce a filamentous mass of greater volume and thickness.

16. In apparatus for collecting continuous filamentary material, means for directing an expanded bundle of filaments through a body of air under turbulent conditions, a winding drum, and a guide arranged between the directing means and the drum and in proximity to the drum for leading the expanded bundle without substantially condensing it onto the drum.

17. In apparatus for collecting continuous filamentary material, means for directing an expanded bundle of filaments through a liquid medium under turbulent conditions, a winding drum partially immersed in the medium, and a guide arranged between the directing means and the drum and in proximity to the drum for leading the expanded bundle without substantially condensing it onto the drum.

18. A low-density, expanded, filamentous product made by the process of claim 13.

19. A low-density, expanded, filamentous product made by the process of claim 14.

20. A low-density, expanded, filamentous product made by the process of claim 2.

21. A low-density, expanded, filamentous product made by the process of claim 15.

22. A low-density, expanded, filamentous product made by the process of claim 15 and comprising filaments having diameters between ½ and 25 microns.

23. A low-density, expanded, filamentous product made by the process of claim 15 and comprising filaments having diameters between ½ and 10 microns.

24. A low-density, expanded, filamentous product made by the process of claim 7.

25. A low-density, expanded, filamentous product made by the process of claim 7 in which the polymer is a hydrophobic vinyl resin and the filaments have diameters between ½ and 25 microns.

26. A low-density, expanded, filamentous product made by the process of claim 13 and having a specific gravity between 0.001 and 0.1.

27. A low-density, expanded, filamentous product made by the process of claim 15, said product comprising hydrophobic vinyl resin filaments and having a specific gravity between 0.001 and 0.1.

28. A low-density, expanded, filamentous product made by the process of claim 13, said product comprising an internal skeleton network of adhered filaments.

29. A low-density, expanded, filamentous product made by the process of claim 9.

30. A low-density, expanded, filamentous product made by the process of claim 10.

31. A low-density, expanded, filamentous product made by the process of claim 11.

32. In apparatus for collecting continuous filamentary material, means for directing an expanded bundle of filaments through a fluid medium under turbulent conditions, a winding drum, and a guide arranged between the directing means and the drum and in proximity to the drum for leading the expanded bundle without substantially condensing it onto the drum.

ROBERT J. TAYLOR.

Certificate of Correction

Patent No. 2,399,258.　　　　　　　　　　　　　　　　　　　　　April 30, 1946.

ROBERT J. TAYLOR

It is hereby certified that error appears in the printed specification of the above numbered patent requiring correction as follows: Page 7, first column, lines 21, 22, and 23, claim 2, strike out the words "the direction of its width while permitting it to expand in thickness" and insert instead *a direction generally transverse to the lay of the filaments therein to produce a filamentous mass of greater volume and thickness*; and that the said Letters Patent should be read with this correction therein that the same may conform to the record of the case in the Patent Office.

Signed and sealed this 30th day of July, A. D. 1946.

[SEAL]

tinuous filaments in the form of a continuously traveling expanded bundle, a winding drum, and a guide arranged between the distributing means and the drum and in proximity to the drum for leading the expanded bundle without substantially condensing it onto the drum.

13. A method of making a light-weight filamentous product comprising the steps of passing a multiple-filament bundle through a fluid medium under turbulent conditions, condensing the bundle into a sheet of a width comparatively large with respect to its thickness, collecting the sheet in the form of a multiple-layered winding and expanding the winding substantially as a unit by pulling two of its opposite edges apart in a direction generally transverse of the lay of the filaments therein to produce a filamentous mass of greater volume and thickness.

14. A method of making a light-weight filamentous product comprising the steps of delivering a multiple-filament bundle from a source of supply, fanning out the bundle as it is delivered in the form of thin sheet in which the filaments intercross in haphazard fashion, collecting the sheet in the form of a multiple-layered winding and expanding the winding substantially as a unit by pulling two of its opposite edges apart in a direction generally transverse of the lay of the filaments therein to produce a filamentous mass of greater volume and thickness.

15. In a method of making a light-weight filamentous product, the steps of passing a multiple-filament bundle through a liquid medium under turbulent conditions, condensing the bundle into a sheet of a width comparatively large with respect to its thickness, collecting the sheet in the form of a multiple-layered winding, severing the winding along its width and subsequently stretching it out while in substantially dry condition in a direction generally transverse to the lay of the filaments therein to produce a filamentous mass of greater volume and thickness.

16. In apparatus for collecting continuous filamentary material, means for directing an expanded bundle of filaments through a body of air under turbulent conditions, a winding drum, and a guide arranged between the directing means and the drum and in proximity to the drum for leading the expanded bundle without substantially condensing it onto the drum.

17. In apparatus for collecting continuous filamentary material, means for directing an expanded bundle of filaments through a liquid medium under turbulent conditions, a winding drum partially immersed in the medium, and a guide arranged between the directing means and the drum and in proximity to the drum for leading the expanded bundle without substantially condensing it onto the drum.

18. A low-density, expanded, filamentous product made by the process of claim 13.

19. A low-density, expanded, filamentous product made by the process of claim 14.

20. A low-density, expanded, filamentous product made by the process of claim 2.

21. A low-density, expanded, filamentous product made by the process of claim 15.

22. A low-density, expanded, filamentous product made by the process of claim 15 and comprising filaments having diameters between ½ and 25 microns.

23. A low-density, expanded, filamentous product made by the process of claim 15 and comprising filaments having diameters between ½ and 10 microns.

24. A low-density, expanded, filamentous product made by the process of claim 7.

25. A low-density, expanded, filamentous product made by the process of claim 7 in which the polymer is a hydrophobic vinyl resin and the filaments have diameters between ½ and 25 microns.

26. A low-density, expanded, filamentous product made by the process of claim 13 and having a specific gravity between 0.001 and 0.1.

27. A low-density, expanded, filamentous product made by the process of claim 15, said product comprising hydrophobic vinyl resin filaments and having a specific gravity between 0.001 and 0.1.

28. A low-density, expanded, filamentous product made by the process of claim 13, said product comprising an internal skeleton network of adhered filaments.

29. A low-density, expanded, filamentous product made by the process of claim 9.

30. A low-density, expanded, filamentous product made by the process of claim 10.

31. A low-density, expanded, filamentous product made by the process of claim 11.

32. In apparatus for collecting continuous filamentary material, means for directing an expanded bundle of filaments through a fluid medium under turbulent conditions, a winding drum, and a guide arranged between the directing means and the drum and in proximity to the drum for leading the expanded bundle without substantially condensing it onto the drum.

ROBERT J. TAYLOR.

Certificate of Correction

Patent No. 2,399,258.           April 30, 1946.

ROBERT J. TAYLOR

It is hereby certified that error appears in the printed specification of the above numbered patent requiring correction as follows: Page 7, first column, lines 21, 22, and 23, claim 2, strike out the words "the direction of its width while permitting it to expand in thickness" and insert instead *a direction generally transverse to the lay of the filaments therein to produce a filamentous mass of greater volume and thickness*; and that the said Letters Patent should be read with this correction therein that the same may conform to the record of the case in the Patent Office.

Signed and sealed this 30th day of July, A. D. 1946.

[SEAL]